(12) United States Patent
Huang et al.

(10) Patent No.: US 7,840,841 B2
(45) Date of Patent: Nov. 23, 2010

(54) AUTOMATIC DETECTION OF FUNCTIONAL DEFECTS AND PERFORMANCE BOTTLENECKS IN NETWORK DEVICES

(75) Inventors: Kung-Shiuh Huang, Orange, CA (US); Hsiu-Ling Lee, Arcadia, CA (US)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 11/862,899

(22) Filed: Sep. 27, 2007

(65) Prior Publication Data

US 2009/0089619 A1    Apr. 2, 2009

(51) Int. Cl.
*G06F 11/00* (2006.01)

(52) U.S. Cl. .............................. 714/25; 714/40; 714/43; 714/736; 714/742

(58) Field of Classification Search .................. 714/25, 714/40, 43, 736, 742
See application file for complete search history.

(56) References Cited

U.S. PATENT DOCUMENTS

| | | | | |
|---|---|---|---|---|
| 5,491,791 A * | 2/1996 | Glowny et al. ................ | 714/37 |
| 5,537,653 A * | 7/1996 | Bianchini, Jr. ................ | 714/25 |
| 5,699,403 A * | 12/1997 | Ronnen ................... | 379/15.04 |
| 5,978,936 A * | 11/1999 | Chandra et al. ............... | 714/43 |
| 6,269,330 B1 * | 7/2001 | Cidon et al. ................... | 714/43 |
| 6,292,909 B1 * | 9/2001 | Hare .......................... | 714/40 |
| 6,574,197 B1 * | 6/2003 | Kanamaru et al. .......... | 370/252 |
| 6,601,195 B1 * | 7/2003 | Chirashnya et al. ........... | 714/43 |
| 6,654,914 B1 * | 11/2003 | Kaffine et al. .................. | 714/43 |
| 7,117,411 B2 * | 10/2006 | McNeely et al. ............. | 714/724 |
| 7,167,912 B1 * | 1/2007 | Dhingra ...................... | 709/223 |
| 7,181,665 B2 * | 2/2007 | Son ............................. | 714/742 |
| 7,206,549 B2 * | 4/2007 | Lin et al. ................. | 455/67.11 |
| 7,209,963 B2 * | 4/2007 | Burton et al. ................ | 709/223 |
| 7,222,255 B1 * | 5/2007 | Claessens et al. .............. | 714/4 |
| 7,242,209 B2 * | 7/2007 | Roberts et al. .............. | 324/765 |
| 7,257,739 B2 * | 8/2007 | Quinlan ....................... | 714/43 |
| 7,290,051 B2 * | 10/2007 | Dobric et al. ............... | 709/224 |
| 7,454,494 B1 * | 11/2008 | Hedayat et al. ............. | 709/224 |
| 7,478,303 B2 * | 1/2009 | Hopkins ..................... | 714/734 |
| 7,583,587 B2 * | 9/2009 | Qiu et al. .................... | 370/216 |
| 7,613,105 B2 * | 11/2009 | Bahl et al. ................... | 370/216 |
| 2004/0015738 A1 * | 1/2004 | Chang ......................... | 714/30 |
| 2004/0015745 A1 * | 1/2004 | Klotz et al. ................... | 714/43 |
| 2005/0246589 A1 * | 11/2005 | Tsai et al. ..................... | 714/38 |
| 2005/0251716 A1 * | 11/2005 | Degrenand .................. | 714/736 |

(Continued)

*Primary Examiner*—Robert Beausoliel
*Assistant Examiner*—Joshua P Lottich
(74) *Attorney, Agent, or Firm*—Haynes & Boone, LLP.

(57) ABSTRACT

A network device, such as a router or switch, has a CPU and a memory operable to receive, store and output computer code. The code includes device configuration files, traffic pattern files, and standard-behavior-output template files adapted for detecting network device functional defects and bottlenecks. The device is operable in a testing mode to act as either a Device Testing Doctor (DTD) or a Device Under Test (DUT), in which it loads into or accepts from a related, interconnected and similarly configured and operable network device selected ones of the device configurations, transmits to or receives from the other device selected ones of the input traffic patterns, compares its own output or that of the other device in response to the input traffic pattern with selected ones of the standard-behavior-output templates, and detects a network device defect or bottleneck in itself or in the other device based on the comparison.

8 Claims, 3 Drawing Sheets

U.S. PATENT DOCUMENTS

| | | | |
|---|---|---|---|
| 2007/0097990 A1* | 5/2007 | Ozaki et al. | 370/395.52 |
| 2007/0174726 A1* | 7/2007 | Nam et al. | 714/43 |
| 2007/0220357 A1* | 9/2007 | Vedanabhatla et al. | 714/43 |
| 2008/0120521 A1* | 5/2008 | Poisson et al. | 714/26 |
| 2009/0086645 A1* | 4/2009 | Hedayat et al. | 370/250 |
| 2009/0100296 A1* | 4/2009 | Srinivasan et al. | 714/43 |
| 2009/0100297 A1* | 4/2009 | Srinivasan et al. | 714/43 |
| 2009/0296588 A1* | 12/2009 | Nishi et al. | 370/242 |

* cited by examiner

AUTOMATIC DETECTION OF FUNCTIONAL DEFECTS AND PERFORMANCE BOTTLENECKS IN NETWORK DEVICES

BACKGROUND

This disclosure relates to computer networks in general, and in particular, to apparatus and methods for efficiently and automatically detecting functional defects and performance bottlenecks in home and small business computer networks.

Although most network devices are subject to some quality assurance (QA) testing before being shipped to customers, their relatively high complexities, coupled with the almost unlimited number of ways in which they can be integrated into networks by users, makes it relatively difficult for the developers of the devices to ensure that they have been exhaustively tested, especially under urgent time-to-market pressures. Further, each of the myriad of possible user applications of the devices takes time to simulate, setup, generate and verify.

Thus, when end-users deploy a particular network device within their network, they often discover that the device does not function according to their expectations in terms of functional behavior and/or performance, and this disappointment can generate a large number of requests for technical support. Moreover, during manufacturer-provided technical support sessions, it is often difficult for the remotely located technical support personnel to understand and replicate exactly the particular end-user application so as to provide the most effective customer support, especially if the user is not technically sophisticated, which is often the case for home users and small business entities lacking information technology (IT) expertise. This situation can result in a large volume of customer complaints, and in many cases, issuance of unnecessary return-to-manufacturer authorizations (RMAs) by the manufacturer of the device.

DESCRIPTION

Overview

In accordance with this disclosure, methods and apparatus are provided for the automated testing of computer network devices that enable in-depth functional and performance testing by inserting traffic-pattern generation codes and functional behavior testing codes into a related pair of the devices of the network, wherein the inserted codes comprise standard configuration template files, standard behavior output template files, and auto testing program and/or script files for measuring correct network behavior, as well as network performance bottleneck discovery codes that measure each software component's utilization rate of the CPU of the device under test for discovering the source of network bottlenecks.

DESCRIPTION OF EXAMPLE EMBODIMENTS

Figure 1:
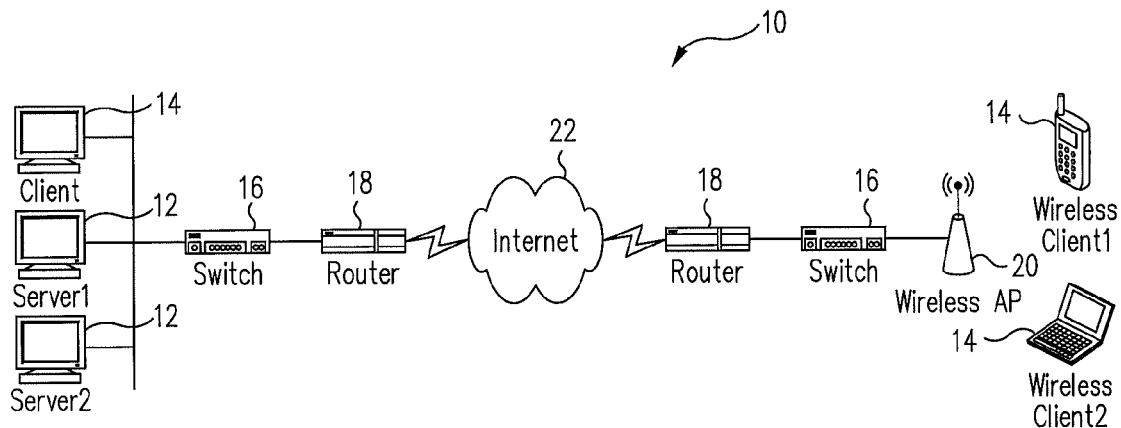
FIG. 1 illustrates a typical home or small business computer network incorporating a number of network devices.

FIG. 1 illustrates a typical home or small business computer network 10 incorporating a number of network devices, including servers 12, clients 14 (both wired and wireless), switches 16, routers 18 and a wireless access point (AP) 20, and at least a portion of which is routed through the internet 22.

Figure 2:
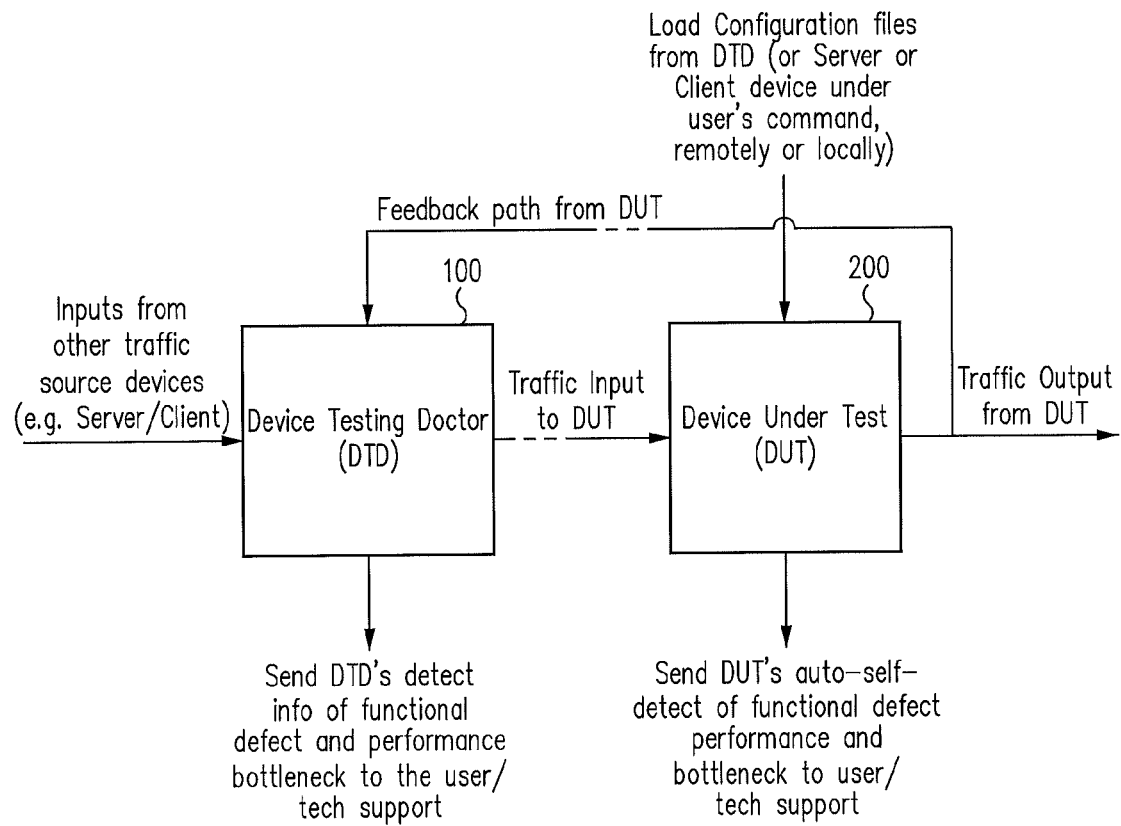
FIG. 2 is a functional block diagram of a pair of connected, related network devices, including a Device Testing Doctor (DTD) and a Device Under Test (DUT) in accordance with an example embodiment of the present disclosure.

FIG. 2 is a functional block diagram of an example embodiment of an apparatus operable to automatically detect functional defects and performance bottlenecks in the network devices of the network 10 of FIG. 1 in accordance with the present disclosure. The apparatus comprises a pair of interconnected and "related" network devices, including a "Device Testing Doctor" (DTD) network device 100, and a "Device Under Test" (DUT) network device 200. Any two interconnected network devices that are "related" to each other, i.e., are in the same "family" of device types, may respectively serve as both the DUT and the DTD, in a manner analogous to the relationship between a patient and a doctor, but with the advantageous distinction that the DUT and DTD can exchange the doctor/patient roles with each other. For example, in a typical home or small business network such as that illustrated in FIG. 1, the two related devices can comprise a pair of the routers 18, a pair of the switches 16, or a router 18 and switch 16, that are connected to each other within the network 10, in either a wired or a wireless manner. Further, to qualify as either a DTD 100 or a DUT 200 in accordance with the present disclosure, the network device must, as a minimum, include a programmable CPU and a memory device of some type.

Most network devices, such as switches 16 and routers 18, incorporate both a CPU and a memory device of some type, e.g., RAM and/or ROM. Thus, at the cost of only a minor increase in the code size of its memory, a network device that is augmented to serve as either a DTD 100 or a DUT 200 can be made capable of generating standard network traffics and transmitting them to any related DUT, monitoring those traffics, and measuring the correctness of the DUT's output in accordance with a standard-behavior-output template, and vice-versa. Accordingly, if a DUT 200 under test by a DTD 100 either malfunctions and/or is the source of a performance bottleneck, the device detecting the malfunction, which may be either the DTD or the DUT itself, can be programmed to, upon the detection of an anomaly, proactively send warning and/or advisory messages, either in real-time, e.g. via the network 10 and/or the internet 22, or time-delayed, e.g., via e-mails, to the user, an IT administrator, and/or to remotely located tech support personnel situated at, e.g., the device manufacturer's site, that includes system log information regarding the current, specific system configuration and the nature of the problem detected, for a rapid diagnosis and cure of the problem.

To achieve this desirable end, additional code must be provisioned within both the DTD 100 and the DUT 200, and this may be made entirely resident in the respective memories of the devices (i.e., via firmware), partially resident, or entirely uploaded into the respective memories of the two devices from, e.g., a local hard drive or CD, or even remotely, via the network 10 and/or the internet 22. The additional testing code required is of three types: 1) Possible network device configurations that can be loaded via configuration files (i=1, . . . N) into the DUT 200; 2) possible traffic patterns that can be generated from the DTD 100 or other traffic sources to the DTD and DUT, such as from a server 12 or client 14 connected to the DTD and DUT; and, 3) one or more standard-behavior-output templates that are specific to detecting device functional defects and network bottlenecks.

As those of skill in this art will appreciate, a "device configuration file" is one that contains the definition of a possible network configuration in a network device, e.g., the DUT. The file format can be a simple text file. For example, each line can simply contain a keyword and one or more arguments of a particular network configuration option, e.g., "FIREWALL BLOCK ALL PING TRAFFICS").

A "standard network traffic pattern file" may comprise a simple script file that contains executable commands to the network device for creating the appropriate testing traffic patterns, e.g., "PING IP_Address [of the network device to be tested] time_duration."

A "standard-behavior-output template file" contains the definitions of the correct behavior outputs associated with a particular device configuration file and a standard network traffic pattern file, and is thus adapted for detecting network device functional defects and bottlenecks. By comparing the traffic behavior of the DUT to the associated standard-behavior-output template file, it can be readily determined whether the DUT is functioning correctly when it is programmed with a given configuration and handling a standard network traffic pattern, e.g., "No PING TRAFFICS PASS-THROUGH FIREWALL." However, if a "PING TRAFFICS PASS-THROUGH FIREWALL" is observed, a defect will be detected in the network device under test that is not functioning correctly according to the instructions of the particular device configuration file.

As illustrated in FIG. 2, the great majority of possible network device test cases can be decomposed into a related, interconnected DTD 100 and DUT 200 pair. Additionally, as will be appreciated by those of skill in the art, in most instances, once the initial network device configuration setup has been done in a real user environment, the device configuration will typically remain in the device without changing for relatively long periods of time, i.e., until the next modification of the network, e.g., by the addition or removal of devices.

Figure 3:
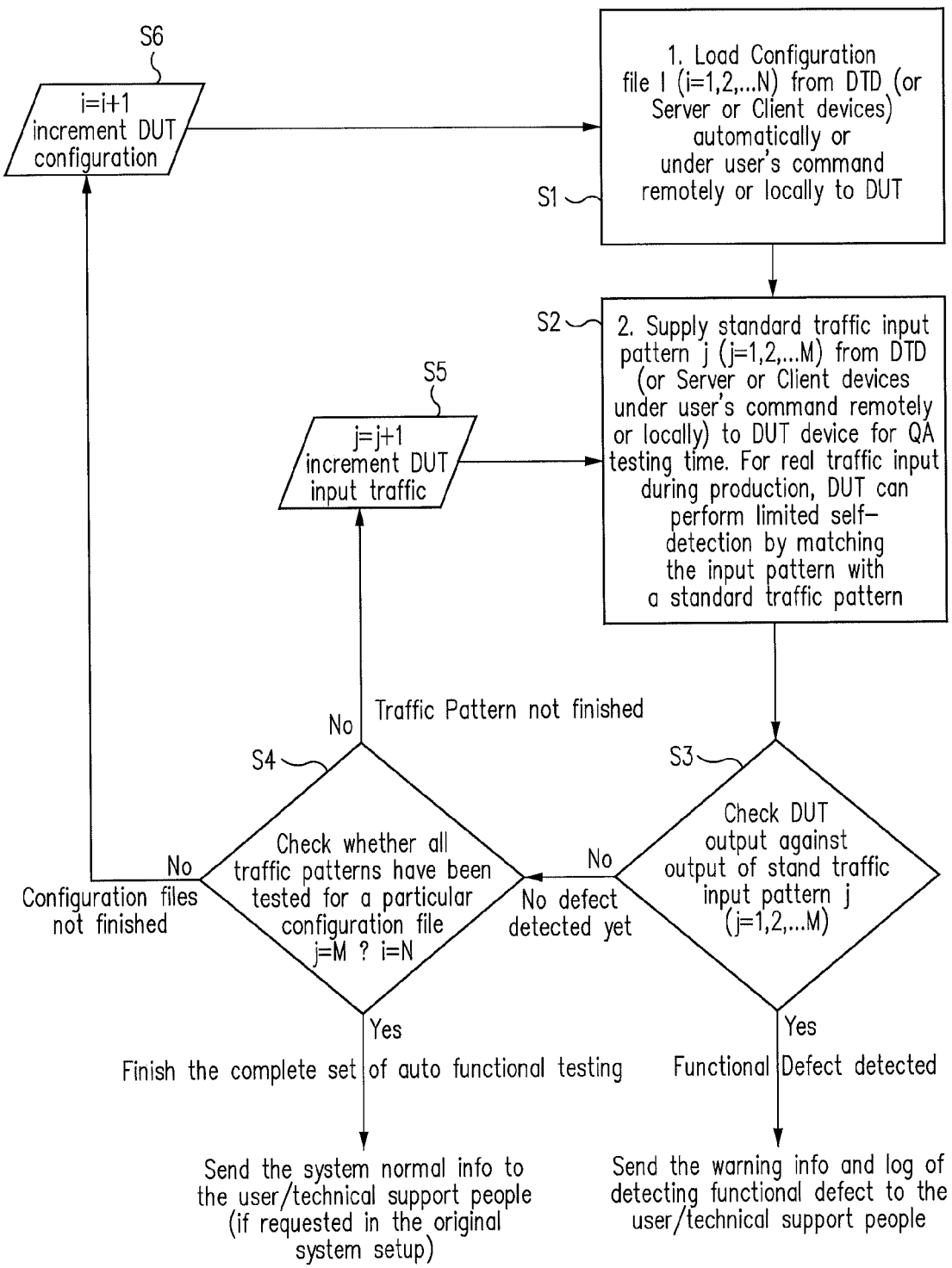
FIG. 3 is a process flow diagram of an example embodiment of method for the automated testing of a DUT network device for functional defects by a DTD in accordance with the present disclosure; and, FIG. 4 is a process flow diagram of an example embodiment of method for the automated testing of a DUT network device for performance bottlenecks by a DTD in accordance with the present invention.
Figure 4:
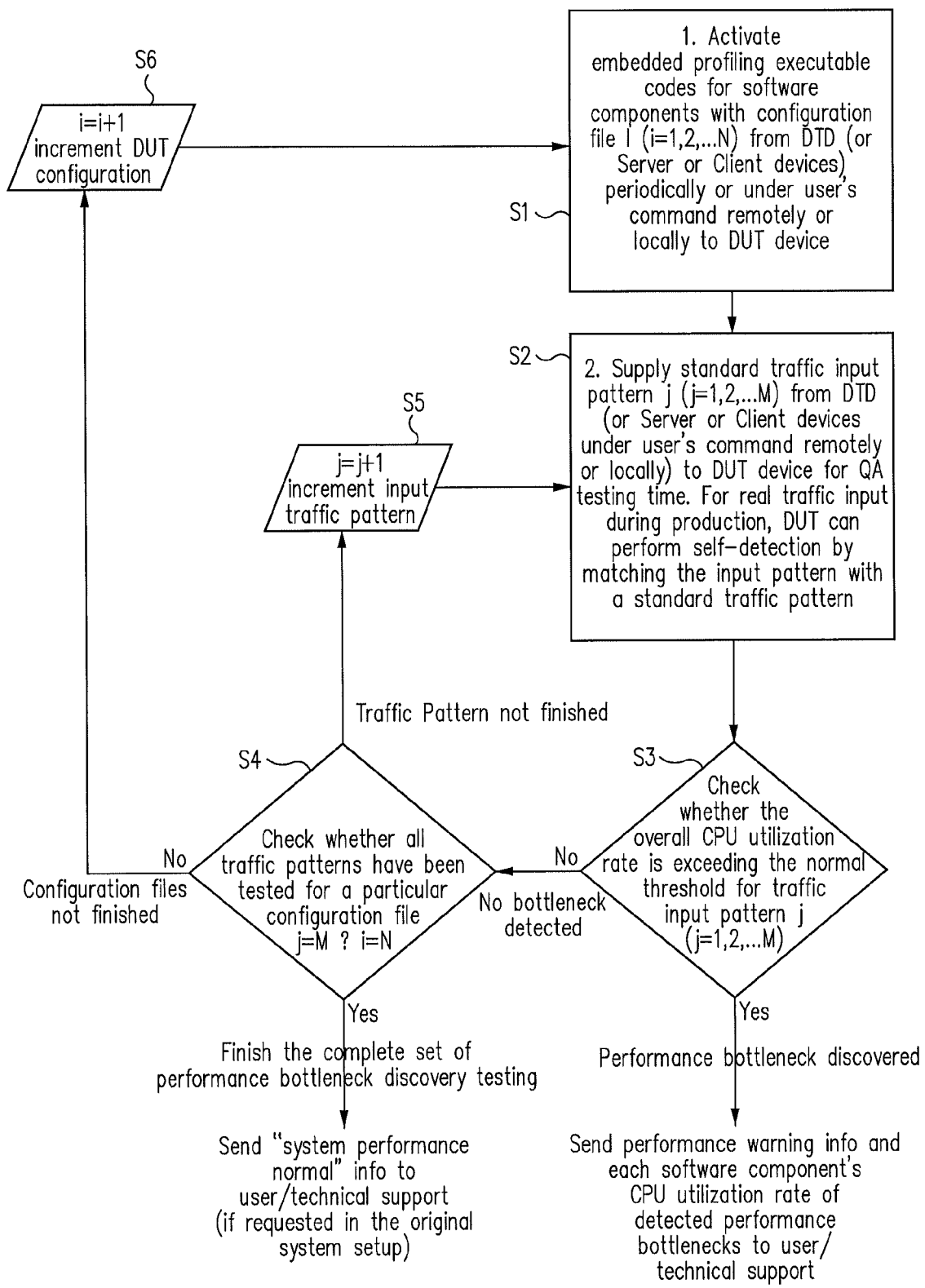

The functional behavior defect and performance bottleneck testing and detection operations or processes are illustrated in the process flow diagrams of FIGS. 3 and 4, respectively, and as may be seen, the two procedures are very similar to each other. During the iterative testing cycles of each, the test cases are determined by two key factors, the possible DUT 200 configurations that are loaded via the configuration files (i=1, . . . N) into the DUT, and the possible resulting traffic patterns that can be generated from the DTD 100 (or from other traffic sources) to the DTD and DUT, such as from a server 12 or a client 14 connected to the DTD-DUT pair. As further illustrated in FIGS. 3 and 4, the functional behavior defect and performance bottleneck detection can be classified into two types of detection or discovery paradigms, viz., "auto-" or self-detection, which is effected by the DUT 200 itself (e.g., a software component is causing a CPU of the DUT to function anomalously), and detection effected by the measurements made by the DTD 100 (e.g., a firewall malfunction, with an impermissible passing of secured traffic from a secured traffic source). In each case, either the DTD 100 or the DUT 200 itself compares the output of the DUT in response to the traffic patterns input to the DUT to the appropriate standard-behavior-output templates respectively stored in (or temporarily uploaded to) the respective memories of the two devices to determine whether a device defect or network bottleneck exists.

In FIG. 3, the functional defect testing procedure begins at step S1, in which a configuration file i (where i=1 2, . . . N) may be loaded from the DTD 100 to the DUT 200, or alternatively, from a server 12 or client 14 to both the DTD and DUT, which again, may be initiated either on a pre-programmed, periodic basis, i.e., fully automatically, or alternatively, on an elective basis, at a user's specific command (and which can be effected either remotely or locally), at the beginning of the test. As discussed above, the initial configuration of the DUT is typically fixed or static for most real user situations before testing begins, and the testing procedure can commence using the initial DUT configuration as the initial configuration file (i=1), and if it develops that the DUT is configured incorrectly, the testing procedure will reveal this.

At step S2 of the functional defect testing procedure, a standard traffic input pattern j (where j=1, 2, . . . M) is supplied to the DUT 200, again either from the DTD 100, or to both the DTD and the DUT from a server 12 or client device 14 under the command of a user, either remotely or locally.

At step 3, a functional defect in the DUT 200 may be self-detected by the DUT, or in some cases, by the DTD 100 using the DUT output that is fed back to the DTD via the feedback connection illustrated in FIG. 2. In either case, the DUT or DTD that detects the defect may be programmed to send an appropriate warning or advisory message and a log or other type of report of the nature of the defect detected to the user and/or to appropriate technical support personnel, on either a real-time or a time-delayed basis, as discussed above. As those of skill in the art will appreciate, for real traffic that is input to the DUT 200 during actual use of the network, the DUT 200 can perform a limited amount of self-detection of functional defects by comparing the actual traffic input pattern with a standard traffic pattern and associated standard-behavior-output template stored in its memory, say pattern j, at step 3 of FIG. 3, but the full benefit of the testing method and apparatus is obtained when the related DTD and DUT are working in cooperation with each other, as discussed above.

At step S4 of the test, a check is made as to whether all of the traffic patterns j, where j=1 to M, have been tested for a particular configuration file i. If not, then at step S5, the number of the traffic pattern j is incremented by 1, and the process then loops back to step S2, where the next, or j+1th traffic pattern is then input to the DUT 200, and this procedure is reiterated until all of the traffic patterns j=1 to M have been tested for the particular configuration file i. When all M traffic patterns have been processed by the DUT 200 for the configuration file i, which is determined at step S5, then the number of the configuration file is incremented by 1 to the next, or i+1th configuration file at step S6, and the above procedure is then repeated for the i+1th configuration file. The functional defect testing procedure continues iteratively in this manner until each of the N configuration files has been tested with each of the M traffic pattern files. When this is done, the test is finished, and, optionally, if no functional defects have been detected during the test, the DTD 100 or the DUT 200 can be provisioned to send a "system normal" log or report to the user and/or appropriate technical support personnel to that effect, in the same manner as a defect is reported above.

The flow of the performance bottleneck testing and detection procedure is illustrated in FIG. 4, and as may be seen by a comparison to FIG. 3, is very similar to that implemented for the detection of a DUT 200 functional defect. As illustrated in FIG. 4, the functional defect testing procedure begins at step S1, in which a configuration file i (where i=1 2, . . . N) is automatically loaded from the DTD 100, or alternatively, to both the DTD 100 and the DUT from a server 12 or a client 14 on the network 10 immediately prior to the testing operation, either automatically, or electively, at a user's command, and which can be effected either remotely or locally, at the beginning of the test. As discussed above, the initial DUT configuration is typically already set and static for most real user situations before testing begins, and the testing procedure can begin using this as the initial device configuration file (i.e., i=1).

At step S2, a standard traffic input pattern j (where j=1, 2, . . . M) is supplied to the DUT 200 from the DTD 100, or alternatively, from a server 12 or a client 14 device under the user's command, either remotely or locally, to both the DTD and the DUT.

At step S3, the DUT 200 itself typically determines whether the overall utilization rate of its CPU is exceeding the normal threshold for the particular traffic input pattern j (j=1, 2, . . . M). If it is, i.e., if a bottleneck is self-detected by the DUT 200, or in some cases, by the DTD 100 at step 3, the DUT and the DTD are programmed to send an appropriate advisory message and a log or other type of report of the software component's utilization rate of the DUT's CPU, i.e., a bottleneck, to the user and/or appropriate technical support personnel, on either a real-time or a time-delayed basis, as discussed above. Further, as discussed above, for real traffic input to the DUT during actual use of the network, the DUT 200 can perform a limited amount of bottleneck self-detection by matching the actual input pattern with a standard traffic pattern j and associated standard-behavior-output CPU usage template associated with the standard traffic pattern stored in its memory.

At step S4 of the test, a check is made as to whether all of the traffic patterns j, where j=1 to M, have been tested for a particular configuration file i. If not, then at step S5, the number of the traffic pattern j is incremented by 1, and the process then loops back to step S2, where the next, or j+1th traffic pattern is then input to the DUT 200, and this procedure is reiterated until all of the traffic patterns j=1 to M have been tested for the particular configuration file i. When all M traffic patterns have been processed by the DUT 200 for the configuration file i, which is determined at step S5, then the number of the configuration file is incremented by 1 to the next, or i+1th configuration file at step S6, and the above procedure is then repeated for the DUT configured with the i+1th configuration file. The functional defect testing procedure continues iteratively in this manner until each of the N configuration files has been tested with each of the M traffic pattern files. When this is done, the test is finished, and, optionally, if no bottlenecks have been detected in the DUT during the test, the DTD 100 or the DUT 200 can be provisioned to send a "system normal" log or report to the user and/or appropriate technical support personnel to that effect, in the same manner as a "system normal" log is reported above.

As those of skill in the art will by now appreciate, the apparatus and methods disclosed herein provide a unique, advantageous mechanism by which defects and performance bottlenecks in a network DUT 200 are automatically detected and identified using a related DTD 100 in combination with the DUT. The DTD-DUT pair can be deployed in either a manufacturer's testing (QA) environment or at a customer site during troubleshooting and diagnostics activities. The universality of the DTD-DUT pairing thus enables it to be deployed in multiple environments and under multiple configurable conditions.

It should be understood that the invention can be practiced with modification and alteration within the spirit and scope of the appended claims. The description is therefore not intended to be exhaustive nor to limit the invention to the precise form disclosed. It should be understood that the invention can be practiced with modification and alteration and that the invention be limited only by the appended claims and the functional equivalents thereof.

What is claimed is:

1. A method, comprising:
   providing a pair of interconnected, related network devices, each being operable in a testing operation to function as both a Device Testing Doctor (DTD) and a Device Under Test (DUT), each having a programmable central processing unit (CPU) and a memory operable to receive, store and output testing code;
   storing testing code in each of the respective memories of the two devices, the testing code comprising:
      network device configuration files;
      network traffic pattern files; and,
      one or more standard-behavior-output template files adapted for detecting network device functional defects and bottlenecks; and,
   with one of the devices functioning as the DTD and the other device functioning as the DUT in the testing operation:
   loading selected ones of the device configurations from the DTD to the DUT;
   transmitting selected ones of the input traffic patterns from the DTD to the DUT;
   comparing the output of the DUT in response to the input traffic patterns with selected ones of the standard-behavior-output templates; and,
   detecting a network device defect or bottleneck in the DUT based on the comparison.

2. The method of claim 1, further comprising sequentially repeating the last three steps of the method until a defect or a bottleneck in the DUT is detected or until each of the input traffic patterns has been transmitted to the DUT while respectively configured in accordance with each of the device configurations.

3. The method of claim 2, further comprising transmitting a first advisory message to a selected recipient upon the detection of a defect or a bottleneck in the DUT, the first advisory message being transmitted by the device detecting the defect or bottleneck and including the nature of the defect or bottleneck detected.

4. The method of claim 2, further comprising transmitting a second advisory message to the selected recipient upon the completion of the testing operation and a failure to detect a defect or a bottleneck in the DUT, the second advisory message being transmitted by the DTD and including the information that the testing operation has been performed and that no defect or bottleneck was detected in the DUT.

5. The method of claim 1, wherein the storing of the testing code comprises permanently storing at least a portion of the code in the respective memories of the two devices at the time of their respective manufacture, or loading at least a portion of the code into the respective memories of the two devices with another network device immediately prior to commencement of the testing operation.

6. The method of claim 1, wherein the two devices are interconnected to each other through a computer network, and wherein the loading of the device configurations and the transmitting of the input traffic patterns are effected through the network.

7. The method of claim 6, wherein the testing operation is initiated automatically by the DTD or is selectably initiated by a user through the network.

8. The method of claim 6, wherein the user initiated testing operation is effected locally or from a remote location.

* * * * *